United States Patent [19]
Schmidt

[11] Patent Number: 5,192,556
[45] Date of Patent: Mar. 9, 1993

[54] PLASTIC MOLDING APPARATUS FOR EQUALIZING FLOW PRESSURE AND FLOW VELOCITY OF PLASTIC MELT

[75] Inventor: Harald Schmidt, Georgetown, Canada

[73] Assignee: Husky Injection Molding Systems Ltd., Bolton, Canada

[21] Appl. No.: 770,246

[22] Filed: Oct. 3, 1991

[51] Int. Cl.⁵ ............................................. B29C 45/23
[52] U.S. Cl. ............................. 425/549; 264/328.15; 425/564; 425/566
[58] Field of Search ............... 425/562, 563, 564, 565, 425/566, 549; 264/328.15

[56] References Cited
U.S. PATENT DOCUMENTS

| | | | |
|---|---|---|---|
| 4,979,892 | 12/1990 | Gellert | 425/566 |
| 5,067,893 | 11/1991 | Osuna-Diaz | 425/564 |
| 5,078,589 | 1/1992 | Osuna-Diaz | 425/564 |

*Primary Examiner*—Tim Heitbrink
*Attorney, Agent, or Firm*—Bachman & LaPointe

[57] ABSTRACT

System delivers a melt stream of moldable plastic material under pressure through a flow passageway into a mold cavity and includes a distributing plate including a distribution channel for conveying a plastic melt, a nozzle including a mold channel therein which communicates with the distribution channel and a mold cavity communicating with the mold channel. A connecting channel is provided connecting the distribution channel with the mold channel.

9 Claims, 2 Drawing Sheets

PLASTIC MOLDING APPARATUS FOR EQUALIZING FLOW PRESSURE AND FLOW VELOCITY OF PLASTIC MELT

BACKGROUND OF THE INVENTION

Typical hot runner valve gated nozzles in plastic molding systems use a single central melt channel to convey the resin from a supply channel in a hot runner manifold to the mold cavity gate. A valve stem is generally employed which is a small diameter rod that is positioned centrally in the nozzle's melt channel and reciprocates to control the opening and closing of the valve gate. Tne resin generally flows in the nozzle channel in a different direction than the resin flow in the hot runner, e.g., the resin may flow in the nozzle channel along an axis perpendicular to the flow in the hot runner. This results in a change of direction of resin from the hot runner to the nozzle and also in the impingement of the resin on the valve stem which factors can create flow characteristics and dead spots that cause undesirable thermal degradation of the resin.

U.S. Pat. No. 4,705,473 to Schmidt attempts to solve this problem by splitting the incoming resin flow to the nozzle. An intermediate element between the manifold and the nozzle contains the single incoming channel and two curved channels extend from the incoming channel and connect to the central nozzle channel on opposed sides. Thus, the melt flow is split in two and is recombined by flowing down opposed sides of the valve stem.

European Patent Application 0,405,007 to Gellert has a similar double channel arrangement that is cast into a single valve member bushing housed inside the hot runner manifold. Again, the melt flow is split into two channels which curve around the central channel to feed into it from opposed sides.

This approach has the disadvantage of splitting the main flow into two distinct and separate paths. At the splitting point the resin is subjected to accelerated shear heating since it must divide into two streams. A second disadvantage is that when the two melt streams recombine in the upper portion of the nozzle channel, they will not completely mix. Their respective melt boundaries may create a "melt front witness" which is visible in the finished part. A third disadvantage of this approach is that to manufacture bushings having two curved channels within them is costly and time consuming. Typically, a "lost-wax" casting approach must be taken in order to develop the smooth channels.

It is therefore a principal object of the present invention to provide a plastic molding system which overcomes the foregoing disadvantages and conveniently conveys resin melt from a hot runner channel to a nozzle channel, even with a change of direction in the resin flow.

It is a still further object of the present invention to provide a system as aforesaid which does not split the resin flow into two channels while conveying the resin as aforesaid.

Further objects and advantages of the present invention will appear hereinbelow.

SUMMARY OF THE INVENTION

In accordance with the present invention a plastic molding system is provided which readily achieves the foregoing objects and advantages.

The present invention provides a plastic molding system for delivering a melt stream of moldable plastic material under pressure through a flow passageway and into a mold cavity, which comprises:

a distributing plate including a distribution channel for conveying a plastic melt;

a nozzle including a mold or nozzle channel communicating with said distribution channel;

a mold cavity communicating with said nozzle channel;

connecting channel means comprising a single flow channel connecting said distribution channel with said nozzle channel including a reservoir portion and a flow restriction portion, wherein the melt flows from the distribution channel to the reservoir portion, to the flow restriction portion, and to the nozzle channel, and wherein the reservoir portion has a larger capacity than the flow restriction portion so that the flow restriction portion holds back the flow from the reservoir portion;

whereby said connecting channel means substantially equalizes flow pressure and flow velocity of the plastic melt prior to flow of the melt to the nozzle channel.

The melt flows in the distribution channel in a first direction and in the nozzle channel in a second direction so that the melt changes direction from the distribution channel to the nozzle channel. Generally, the axis of the nozzle channel is essentially perpendicular to the axis of the distribution channel.

A valve gate is provided between the mold cavity and nozzle channel, and a reciprocable valve stem is movable in the nozzle channel from a first position closing the valve gate to a second position opening the valve gate.

A flow entry portion of the connecting channel means is provided between the distribution channel and reservoir portion. The distribution channel terminates in an annular valve bushing, wherein the flow entry portion is adjacent the valve bushing and comprises a varying height channel that distributes the melt substantially equally around the periphery of the bushing. The reservoir portion comprises a channel with substantially constant cross-section around the valve bushing.

The flow restriction portion has a substantially constant width and length around the bushing and is operative to hold back the flow from the reservoir portion so that the flow pressure and flow velocity is substantially equalized prior to flow of the melt to the nozzle channel. The connecting channel includes an exit channel provided between the flow restriction portion and the nozzle channel, and wherein the valve bushing has a substantially conical tip adjacent the exit channel to insure that the melt is transferred substantially equally from the flow restriction portion to the exit channel and thence to the nozzle channel.

Further features and advantages of the present invention will appear hereinbelow.

BRIEF DESCRIPTION OF THE DRAWINGS

The features of the present invention will be more readily understandable from a consideration of the following illustrative embodiments in which.

DETAILED DESCRIPTION

Figure 1:
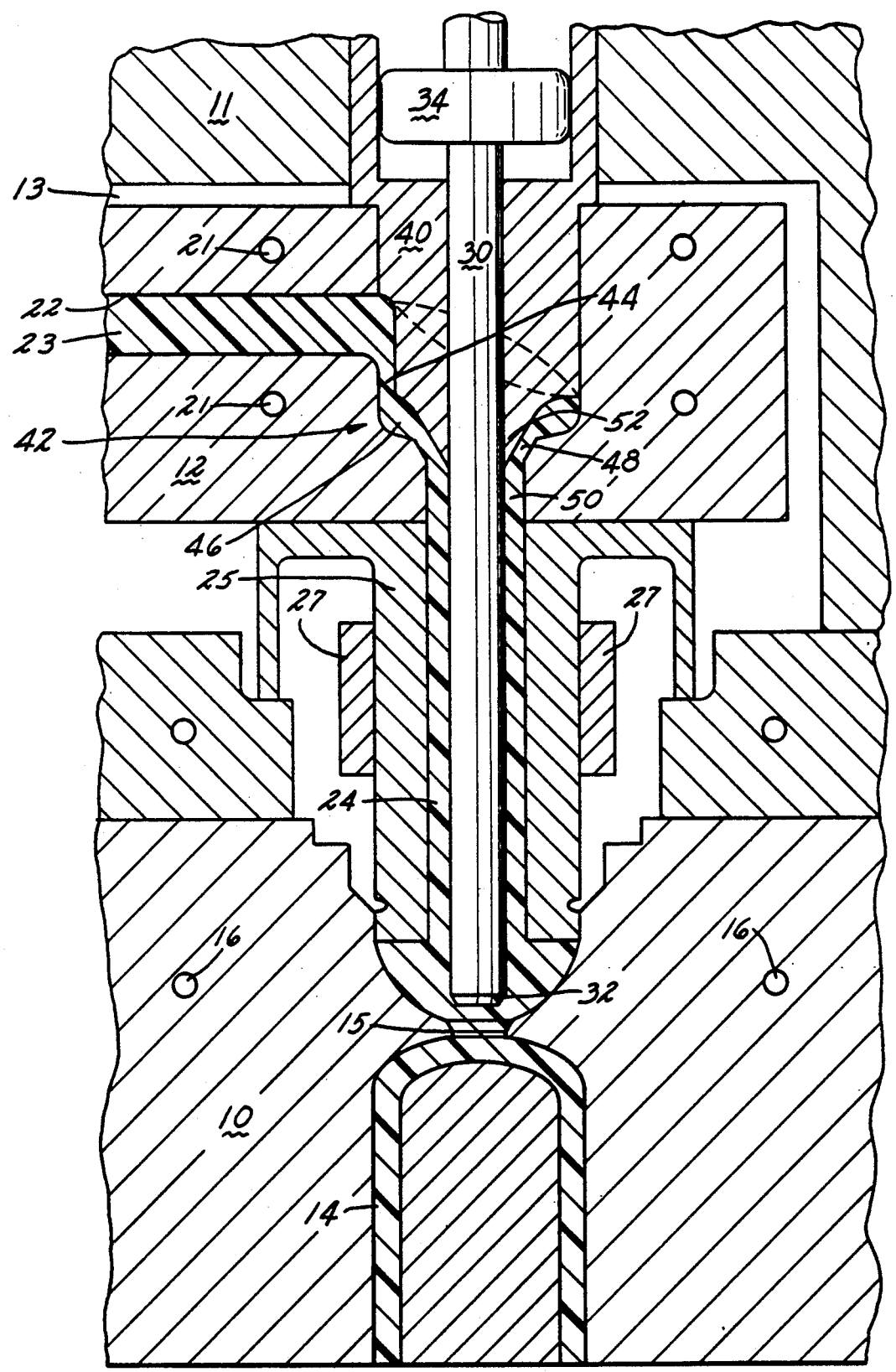
FIG. 1 is a cross-sectional view of the molding system of the present invention with the valve stem in the retracted position and the gate in the open condition.
Figure 2:
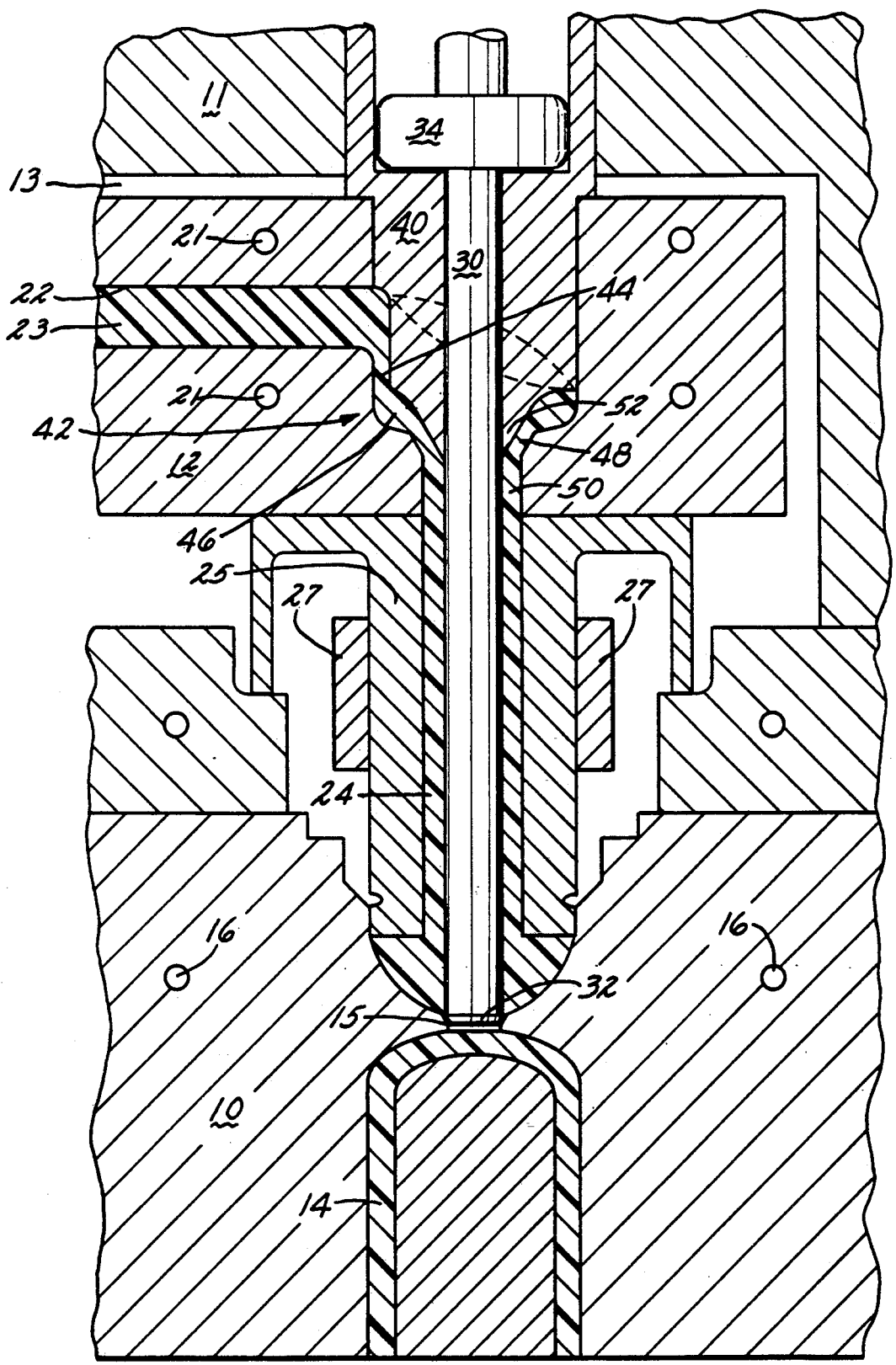
FIG. 2 is a view similar to FIG. 1 with the valve stem in the forward position and the gate in the closed condition.

FIGS. 1 and 2 show a representative embodiment of the present invention, with FIG. 1 showing the valve gate open and the movable valve stem retracted and FIG. 2 showing the gate closed and the valve stem in the forward position adjacent the valve or mold gate. For simplicity, only a single mold cavity has been shown; however, it should be understood that the apparatus of the present invention is particularly suitable for multicavity molds wherein the system shown in FIGS. 1 and 2 would be duplicated for each mold.

Referring to the preferred embodiments of FIGS. 1 and 2, stationary mold plate 10 is separated from manifold plate 11 by hot runner 12, with an air gap 13 between the manifold plate and hot runner. Mold plate 10 together with a coacting movable mold plate (not shown) defines a plurality of mold cavities 14, with only one shown in the drawings. The mold cavities are accessible through mold or valve gate 15. Cooling channels 16 may be provided in the mold plates.

Hot runner manifold or distributing plate 12 including manifold heating means 21 supplied by an appropriate heating source (not shown) contains transverse manifold channel or distribution channel 22 which is fed with the desired molten plastic 23 from an appropriate source of molten plastic (not shown) for delivering the molten plastic under pressure. Manifold or distribution channel 22 communicates with and feeds molten plastic 23 to nozzle channel 24 in nozzle 25 which may be heated if desired via nozzle heaters 27 and which in turn feeds the molten plastic to mold 14 via gate 15. The axis of the nozzle channel 24 is perpendicular to the axis of the distribution channel 22 so that the plastic melt 23 changes direction from the distribution channel to the nozzle channel.

Valve stem 30 is provided which may comprise a steel rod having a shaped rod tip 32 mating with mold gate 15. Means 34 are provided for moving stem 30 from a first position shown in FIG. 1 spaced from mold gate 15 to provide a wide flow channel in the mold or valve gate to a second position shown in FIG. 2 adjacent the gate and blocking entry to the mold cavity. Naturally, any desired means may be provided for moving the valve stem, as for example, a hydraulic piston which is more space efficient or an air piston which has less risk of fire.

Hot runner 12 contains manifold or distribution channel 22 that terminates in valve bushing 40. Molten plastic 23 flows from distribution channel 22 to nozzle channel 24 via connecting channel 42. The connecting channel permits the resin to change flow direction from the distribution channel to the nozzle channel without being subjected to excess shear heating or without being trapped in dead spots, which would create degradation of the resin.

The connecting channel 42 is formed by machining the lower surface of bushing 40 in combination with the shape machined in hot runner 12. The connecting channel 42 includes flow entry portion 44, a ring portion or reservoir portion 46 and a flow restriction portion 48 and an exit channel 50. The flow entry portion 44 consists of a varying height and constant width channel as shown that distributes the resin equally around the periphery of valve bushing 40. The ring or reservoir portion 46 has a constant cross section around the valve bushing and acts like a reservoir in which the resin equalizes pressure and flow velocity prior to moving on to the next section. The flow restriction portion 48 is of constant width and length around the bushing and serves to hold back the flow slightly in the reservoir to permit said equalization to occur. The combination of the aforesaid dimensions provide that minimal dead spots or excessive shear heating of the resin occur. The bushing is shaped at the exit channel 50 with a conical shape 52 to insure that the resin flushes into exit channel 50 equally around the valve stem 30 preventing any degradation from a dead spot.

Thus, the resin flow throughout the channel system is homogeneous and at no time is the resin split into multiple, distinct paths. Moreover, the change in resin direction is accomplished easily and conveniently without adverse consequences.

It is to be understood that the invention is not limited to the illustration described and shown herein, which are deemed to be merely illustrative of the best modes of carrying out the invention, and which are suscepible of modification of form, size, arrangement of parts and details of operation. The invention rather is intended to encompass all such modifications which are within its spirit and scope as defined by the claims.

What is claimed is:

1. A plastic molding apparatus for delivering a melt stream of moldable plastic material under pressure through a flow passageway and into a mold cavity, which comprises:

a distributing plate including a distribution channel for conveying a plastic melt;

a nozzle including a nozzle channel communicating with said distribution channel;

a mold cavity communicating with said nozzle channel;

connecting channel means connecting said distribution channel with said nozzle channel, said connecting channel means including a flow entry portion, a reservoir portion and a flow restriction portion, wherein the melt flows from the distribution channel to the flow entry portion, to the reservoir portion, to the flow restriction portion, and to the nozzle channel, and wherein the flow entry portion comprises a varying height channel that distributes the melt substantially equally and wherein the reservoir portion has a larger capacity than the flow restriction portion so that the flow restriction portion holds back the melt flow from the reservoir portion;

whereby said connecting channel means substantially equalizes flow pressure and flow velocity of the plastic melt to the nozzle channel.

2. An apparatus according to claim 1 wherein the distribution channel is oriented so that the melt flows therein in a first direction and the nozzle channel is oriented so that the melt flows therein in a second direction, whereby the melt changes direction from the distribution channel to the nozzle channel.

3. An apparatus according to claim 2 wherein the axis of the nozzle channel is essentially perpendicular to the axis of the distribution channel.

4. An apparatus according to claim 1 wherein the connecting channel comprsies a single flow channel.

5. An apparatus according to claim 1 including a valve gate between the mold cavity and nozzle channel and a reciprocable valve stem in the nozzle channel movable from a first position closing the valve gate to a second position opening the valve gate.

6. An apparatus according to claim 1 wherein the distribution channel terminates in an annular valve bushing, wherein the flow entry portion is adjacent the valve bushing and comprises a varying height channel that distributes the melt substantially equally around the periphery of the bushing.

7. An apparatus according to claim 6 wherein the reservoir portion comprises a channel with substantially constant cross-section around the valve bushing.

8. An apparatus according to claim 7 wherein the flow restriction portion has a substantially constant width and length around the valve bushing and is operative to hold back the flow from the reservoir so that the flow pressure and flow velocity is substantially equalized prior to flow of the melt to the nozzle channel.

9. An apparatus according to claim 8 wherein the connecting channel includes an exit channel between the flow restriction portion and the nozzle channel, and wherein the valve bushing has a substantially conical tip adjacent the exit channel to insure that the melt is transferred substantially equally from the flow restriction portion to the exti channel and thence to the nozzle channel.

* * * * *